Jan. 17, 1928.　　　　　　　　　　1,656,608
D. M. SARKISIAN
BRAKE BAND CONSTRUCTION
Filed July 23, 1926
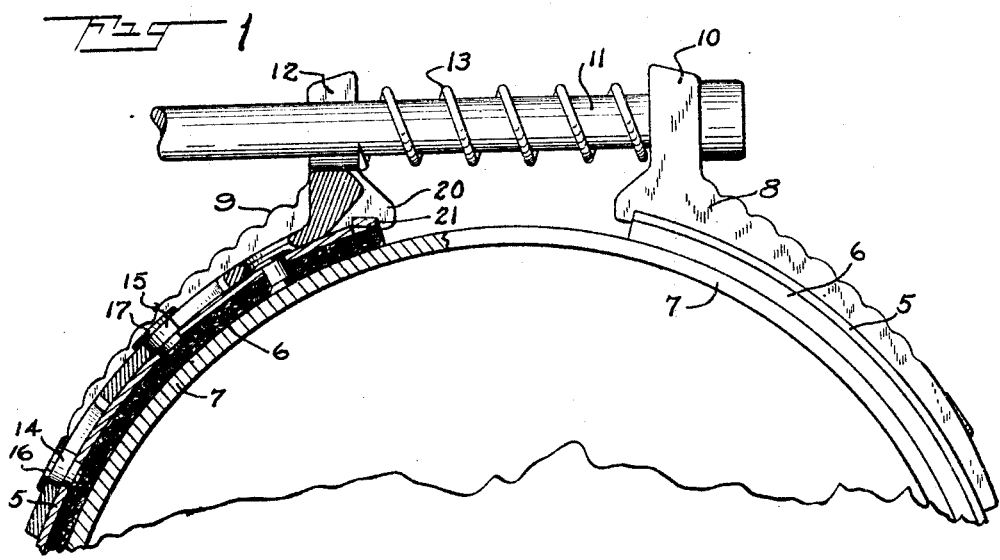
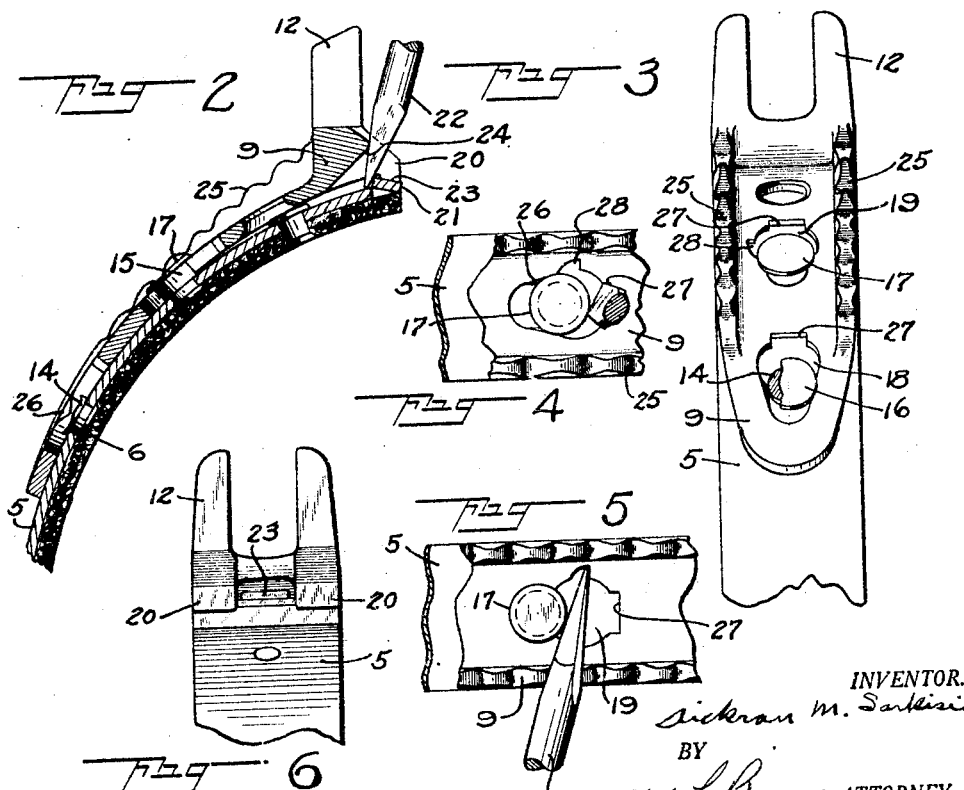
INVENTOR.
Dickran M. Sarkisian
BY
Abel L. Brownrigg ATTORNEY Patented Jan. 17, 1928.

1,656,608

UNITED STATES PATENT OFFICE.

DICKRAN M. SARKISIAN, OF FOREST HILLS, NEW YORK.

BRAKE-BAND CONSTRUCTION.

Application filed July 23, 1926. Serial No. 124,307.

This invention relates generally to the construction of brake bands and more particularly to a brake band of the type having a removable end fitting.

In fitting brake bands to the friction drums of the transmission mechanism of Ford engines, the attaching clip member must be removed from one end of the band in order to insert the band between the drum and the housing in which the transmission mechanism is contained. Because of the restricted space in which to work the task of inserting a brake band in position is attended with considerable difficulty, particularly with relation to the removing of the detachable terminal clip from one end of the band and the reattaching of the clip to the band following the passing of the free end of the band around the drum. The difficulty of replacing brake bands of the types heretofore known and used, which is thus occasioned, has caused the operation of removing or relining brake bands to be unduly expensive with respect to the amount of time consumed.

A general object of the present invention is to provide a brake band structure which can be readily removed from and replaced in position with a minimum expenditure of time.

With this and other objects in view the invention comprises a flexible steel brake band having a terminal fitting permanently attached to one end and a fitting removably attached to the other end. The invention has particularly to do with the structural relation of the removable fitting to the end of the brake band. The brake band is supplied with a pair of longitudinally separated rivets having enlarged heads and, at the extreme forward end, with a lug or tongue preferably formed in the material of the band itself. The terminal fitting is adapted to extend along the end section of the brake band and is provided with two keyhole shaped slots adapted to cooperate with the headed rivets referred to in order to bring about a locking relation of the fitting to the brake band. The forward extremity of the fitting is provided with a pair of laterally separated downturned lugs which are adapted to snap over the adjacent end of the brake band when the fitting has been moved to locking relation with respect to the headed rivets referred to.

With this construction the removal of the fitting from the band is effected by downward pressure of a screw driver or similar tool exerted on the brake band immediately at the rear of the lug or tongue member referred to. A downward thrust exerted at this point has the effect of pushing the end portion of the band downwardly to unlatching relation with respect to the lugs on the fitting while a circumferential thrust, which may be then exerted on the handle of the tool, has the effect of forcing the fitting along the surface of the band to produce an unlocked relation of the keyhole slots. On the other hand, the attachment of the fitting to the band is as readily effected. It is brought about by laying the fitting in place on the band with the headed rivets extending through the enlarged portions of the keyhole slots, then in inserting a tool between the edge of one of the rivets and the edge of the keyhole slot to produce an initial movement of the rivet toward the restricted end of the slot, then in inserting the tool in a laterally disposed notch in the keyhole slot and again exerting a prying thrust on the headed rivet to complete the operation of forcing the headed rivet into the restricted end of the slot and causing the terminal lugs on the fitting to snap over the end of the band.

Other features of the invention will be hereinafter referred to.

In the drawings, in which a preferred embodiment of the invention has been selected for illustration:

Fig. 1 is a view in side elevation and vertical section of a portion of a brake band embodying the invention;

Fig. 2 is a view in vertical section of a portion of the structure shown in Fig. 1 showing the operation of removing the fitting from its position on the band;

Fig. 3 is a top plan view of the parts shown in Fig. 2 showing the fitting placed on the band in readiness to force the same to locking position;

Fig. 4 is a plan view of a portion of the device shown in Fig. 3 showing the operation of moving the fitting through a preliminary portion of the locking operation;

Fig. 5 is a view similar to Fig. 4 showing the operation of moving the fitting to its completely locked position;

Fig. 6 is an end view of the band with the fitting locked in position thereon.

Referring to the drawings for a more detailed description of the invention, in Fig. 1 there is shown a brake band 5 provided with a brake lining 6, the band being mounted in position on a brake drum 7. The brake band shown is of the type used with Ford automobile engines and is provided with a terminal fitting 8 permanently attached to one end of the band and with a fitting 9 removably attached to the other end. The fitting 8 is provided with an apertured lug 10 through which the operating bolt 11 extends while the fitting 9 is provided with two spaced apart lugs 12 through which the bolt 11 passes, a spring 13 being interposed between the lugs 10 and 12 and tending to force the lugs apart to thereby release the brake lining from contact with the drum 7. Actuating means (not shown) are attached to the end of the bolt 11 to move the band to gripping relation with respect to the drum 7.

The end portion of the band 5 to which the removable fitting 9 is attached is provided with two longitudinally spaced apart rivets 14 and 15 having head portions 16 and 17. The body of the fitting 9 is provided with a pair of keyhole slots 18 and 19 adapted to cooperate with the rivets 14 and 15 to bring about a locked relation of the parts.

The forward end of the fitting 9 is provided with a pair of laterally spaced apart downwardly projecting lugs 20 adapted to snap over the extreme forward edge 21 of the band 5 in a locked relation of the parts as is shown in Fig. 1 of the drawings.

In order to remove the fitting 9 from the adjacent end of the brake band 5, reference is made to Fig. 2 of the drawings, wherein a tool 22, such as a screw driver, is inserted between the spaced apart terminal lugs 20 and to the rear of an upturned lug or tongue member 23 formed in the end portion of the brake band 5. The tool 22 when placed in this position is pressed downwardly to force the end portion 21 of the band from its position to the rear of the downturned lugs 20. A prying movement is then applied to the tool 22 by using a forwardly projecting angular portion 24 formed on the fitting as a fulcrum member. The band is thus thrust to the right, as is shown in Fig. 2, thereby forcing the fitting 9 to the left in order to force the keyhole slots 18 and 19 to a position wherein the heads 16 and 17 of the rivets 14 and 15 are moved into register with the enlarged ends of the keyhole slots 18 and 19. When this relative disposition of the parts has been effected, the fitting can be readily lifted from its engaging position with the brake band, as will be clear.

In order to lock the fitting to the band 5 following the insertion of the band in encircling relation to the drum 7, the fitting is placed loosely in position on the terminal band with the heads 16 and 17 of the rivets 14 and 15 entered through the enlarged portions of the keyhole slots 18 and 19. The fitting is then moved forwardly toward the free end of the band by pressure of the hand of the operator applied to the roughened exposed edges 25 of the fitting. This manual movement of the fitting has the effect of initiating the operation of moving the restricted portions of the keyhole slots 18 and 19 into cooperation with the rivet members 14 and 15. In order to facilitate this starting movement of the parts toward locking relation, the edges of the restricted portions of the keyhole slots are beveled as at 26 to facilitate the movement of the edges of the restricted portions beneath the heads 16 and 17 of the rivets.

Following the initial movement which is thus exerted by hand, the tool 22 is applied to the forward slot 19, as is shown in Fig. 4 of the drawings. The tool is thereupon turned or moved using the forward edge of the rivet head 17 as a fulcrum to force the fitting toward locking position by the engagement of the tool with the inner forward edge 27 of the slot. When this second movement in the operation of moving the parts to locking position has been effected, the tool is removed and inserted in a notch 28 formed in the lateral edge of the slot 19. The tool is thereupon again turned or otherwise moved to produce another prying movement which forces the fitting forwardly to cause the downturned lugs 20 to snap over the extreme end 21 of the band 5, whereupon the parts are locked securely in position.

It will be seen that I have thus provided a brake band construction in which the removable terminal fitting can be readily and quickly removed from its position in order to withdraw the brake band from operative relation to the drum, and, on the other hand, upon the replacement of the band in position, the secure attachment of the terminal fitting to the free end of the band can be readily effected with a minimum expenditure of time and effort.

What I claim is:

1. In a brake band structure, a terminal fitting provided with longitudinally separated keyhole slots and having laterally separated radially inward directed lugs at one end thereof, a brake band having headed lugs adapted to enter the keyhole slots in the fitting, one of the slots being provided with a notch in a lateral edge thereof whereby a tool may be inserted in the notch and moved into engagement with the head of the lug as a fulcrum, whereby to pry the fitting into locked relation with the lug and to force the inwardly directed lugs into locking engagement with the end of the band.

2. In a brake band structure, a terminal fitting provided with longitudinally separated keyhole slots and having laterally separated radially inward directed lugs at one end thereof, the inwardly directed lugs on the fitting being adapted to engage the terminal edge of the band, and an outwardly directed tongue formed on the band between the lugs on the fitting, whereby a tool placed in engagement with the face of the lug and moved into engagement with the end of the fitting as a fulcrum can be utilized to force the end of the band out of locking engagement with the lugs.

3. In a brake band structure, a terminal fitting provided with longitudinally separated keyhole slots and having laterally separated radially inward directed lugs at one end thereof adapted to engage the terminal edge of the band, the brake band being provided with an upwardly directed tongue located between the lugs on the fitting, the brake band being imperforate immediately adjacent the tongue and in the rear thereof, the end of the band having locking engagement with the inwardly extending lugs in the locked position of the parts, and the adjacent end portion of the fitting being formed to provide a fulcrum for the use of a tool in prying the end of the band member from locking engagement with the lugs.

4. In a brake band structure, a terminal fitting provided with longitudinally separated keyhole slots and having laterally separated radially inward directed lugs at one end thereof, the edges of the keyhole slots being beveled at the beginning of the restricted portions thereof, one of said slots being provided with a notch in one of the lateral edges thereof, the brake band being provided with an upwardly directed tongue located between the lugs on the fitting when the fitting is in engagement with the band, the end of the band having locking engagement with the inwardly directed lugs when in locked position and the adjacent end of the fitting having a portion formed to provide a fulcrum for a tool used in prying the band from locking engagement with the lugs.

DICKRAN M. SARKISIAN.